(12) United States Patent
Adachi et al.

(10) Patent No.: US 9,412,489 B2
(45) Date of Patent: Aug. 9, 2016

(54) WATERPROOF STRUCTURE FOR CONDUCTIVE PATH

(75) Inventors: Hideomi Adachi, Kosai (JP); Hidehiko Kuboshima, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 19 days.

(21) Appl. No.: 13/814,682

(22) PCT Filed: Jul. 27, 2011

(86) PCT No.: PCT/JP2011/067101
§ 371 (c)(1),
(2), (4) Date: Feb. 6, 2013

(87) PCT Pub. No.: WO2012/020644
PCT Pub. Date: Feb. 16, 2012

(65) Prior Publication Data
US 2013/0140056 A1    Jun. 6, 2013

(30) Foreign Application Priority Data
Aug. 9, 2010 (JP) .................................. 2010-178307

(51) Int. Cl.
| | |
|---|---|
| *H01B 3/32* | (2006.01) |
| *H01R 13/52* | (2006.01) |
| *H02G 15/013* | (2006.01) |
| *H01R 13/58* | (2006.01) |
| *H01R 13/504* | (2006.01) |

(52) U.S. Cl.
CPC .............. *H01B 3/32* (2013.01); *H01R 13/5205* (2013.01); *H01R 13/5845* (2013.01); *H02G 15/013* (2013.01); *H01R 13/504* (2013.01)

(58) Field of Classification Search
USPC ...................................................... 174/120 SR
See application file for complete search history.

(56) References Cited

U.S. PATENT DOCUMENTS

| | | | |
|---|---|---|---|
| 2008/0119078 A1* | 5/2008 | Arai ................... | H01R 13/5202 439/279 |
| 2008/0132104 A1 | 6/2008 | Iwase et al. | |

(Continued)

FOREIGN PATENT DOCUMENTS

| | | |
|---|---|---|
| EP | 1837886 A1 | 9/2007 |
| GB | 2 112 218 A | 7/1983 |

(Continued)

OTHER PUBLICATIONS

International Search Report (PCT/ISA/210) dated Sep. 20, 2011, issued by the International Searching Authority in International Application No. PCT/JP2011/067101.

(Continued)

*Primary Examiner* — Timothy Thompson
*Assistant Examiner* — Krystal Robinson
(74) *Attorney, Agent, or Firm* — Sughrue Mion, PLLC

(57) ABSTRACT

A waterproof structure for a conductive path for waterproofing a conductive path without imposing an unnecessary load on a conductor, including a plurality of grooves formed on an outer circumferential surface of an insulator of a wire. The grooves 9 are formed within a predetermined range on the outer circumferential surface of the insulator and an overmold part is a seal member made of an elastomer, and is disposed and formed within the predetermined range of an electric wire to prevent water from entering the conductive path.

3 Claims, 3 Drawing Sheets

(56) References Cited

U.S. PATENT DOCUMENTS

2009/0029603 A1  1/2009  Tokairin
2010/0184318 A1* 7/2010  Bogart ............... H01R 13/5202
                                                     439/278

FOREIGN PATENT DOCUMENTS

| GB | 2112218 A | * | 7/1983 | ......... H01R 13/5845 |
| JP | 58-94774 A | | 6/1983 | |
| JP | 61-85028 U | | 6/1986 | |
| JP | 2002-254468 A | | 9/2002 | |
| JP | 2002254468 A | * | 9/2002 | |
| JP | 2009-32589 A | | 2/2009 | |
| JP | 2010-73485 A | | 4/2010 | |

OTHER PUBLICATIONS

Written Opinion (PCT/ISA/237) dated Sep. 20, 2011, issued by the International Searching Authority, in International Application No. PCT/JP2011/067101.
Extended European Search Report, dated Nov. 15, 2013, issued by the European Patent Office, in counterpart Application No. 11816310.4.
Office Action dated Oct. 21, 2014, issued by the State Intellectual Property Office of the P.R. China in counterpart Chinese Application No. 201180039174.3.
Japanese Office Action dated Sep. 24, 2014 issued by Japanese Patent Office in counterpart Japanese Patent Application No. 2010-178307.
Communication issued on Mar. 3, 2015 by the European Patent Office in related application No. 11816310.4.

* cited by examiner

WATERPROOF STRUCTURE FOR CONDUCTIVE PATH

TECHNICAL FIELD

The present invention relates to a waterproof structure for waterproofing a conductive path.

BACKGROUND ART

As a waterproof structure for a conductive path, for example, a waterproof structure disclosed in the following Patent Document 1 is known. In FIG. 3, from a conductive path drawing part 52 of a connector housing 51, an electric wire 53 is drawn out. A seal member 54 is provided on the electric wire 53. This seal member 54 is provided to be watertight with respect to an inner circumferential surface of the conductive path drawing part 52. Also, the seal member 54 is provided to be watertight with respect to an outer circumferential surface of a cover of the electric wire 53. The seal member 54 is molded with an elastomer. A plurality of protrusions 55 is formed on an inner circumferential surface of the seal member 54.

The watertight state of the inner circumferential surface of the conductive path drawing part 52 and an outer circumferential surface of the seal member 54 is made by melting the elastomer with heat generated when the connector housing 51 is molded with a resin. Also, the watertight state of the inner circumferential surface of the seal member 54 and an outer circumferential surface of an insulator of the electric wire 53 is made by wedging the protrusions 55 into the outer circumferential surface of the insulator with pressure of the resin generated when the connector housing 51 is molded with the resin.

CITATION LIST

Patent Document

Patent Document 1: JP-A-2002-254468

DISCLOSURE OF THE INVENTION

Problems that the Invention is to Solve

In the above-mentioned conventional waterproof structure, since the watertight state of the inner circumferential surface of the seal member 54 and the outer circumferential surface of the insulator of the electric wire 53 is made by wedging the protrusions 55 into the outer circumferential surface of the insulator with the pressure of the resin generated when the connector housing 51 is molded with the resin, the waterproof structure has a problem as follows. In other words, since a conductor of the electric wire 53 is compressed from the whole circumference side, the waterproof structure has a problem of becoming a state in which an unnecessary load is always imposed on the conductor.

In order to prevent an unnecessary load from being imposed on the conductor, for example, a measure of weakly wedging the protrusions 55 into the outer circumferential surface of the insulator can be considered. However, steps occurring due to the wedging become small, and thus there is a problem that it becomes difficult to obtain a distance allowing passage of moisture penetrating from an end portion of the seal member 54 (there is a problem that it becomes difficult to obtain a creepage distance).

The present invention was made in view of the above-mentioned circumferences, and an object of the present invention is to provide a waterproof structure for a conductive path which can waterproof a conductive path without imposing an unnecessary load on a conductor and which can sufficiently obtain a creepage distance.

Means for Solving the Problems

The above-mentioned object of the present invention can be achieved by the following configurations.

(1) A waterproof structure for a conductive path in which a groove is provided to extend in a circumferential direction within a predetermined range on an outer circumferential surface of an insulator covering a conductor, and an overmold part is formed of an elastomer over the entire predetermined range such that the overmold part fills the groove.

According to the waterproof structure for the conductive path having the above-mentioned configuration (1), since the groove is provided on the outer circumferential surface of the insulator, the waterproof structure can securely obtain a creepage distance due to the groove. Also, since the overmold part is provided to fill the groove on the outer circumferential surface of the insulator, the waterproof structure can prevent an unnecessary load from being imposed on the conductor.

(2) The waterproof structure for the conductive path according to the above-mentioned configuration (1), wherein the overmold part is provided to be watertight with respect to a conductive path drawing part of a housing.

According to the waterproof structure for the conductive path having the above-mentioned configuration (2), in the waterproof structure, the overmold part and the conductive path drawing part of the housing become watertight.

BEST MODE FOR CARRYING OUT THE INVENTION

Hereinafter, an embodiment of the present invention will be described with reference to the drawings.

The present invention is a suitable invention to be applied to a part of an electric connector where an electric wire serving as a conductive path is drawn out from a connector housing, a part of an electronic device where an electric wire is drawn out from a housing, and so on, and in the present embodiment, the former will be described below as an example.

Figure 1:
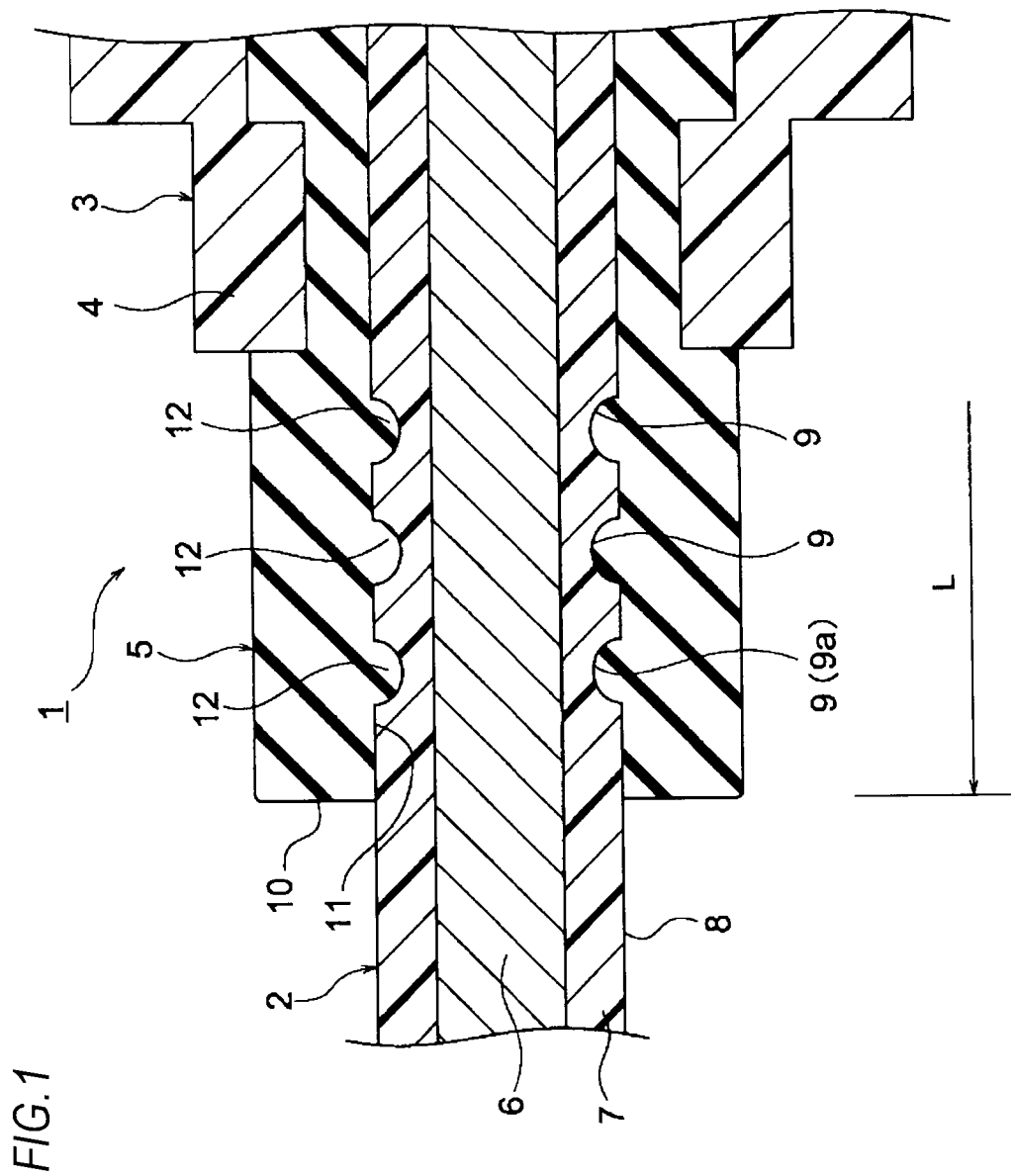
FIG. 1 is a cross-sectional view illustrating a waterproof structure for a conductive path according to an embodiment of the present invention.

In FIG. 1, from the opposite side of an electric connector 1 to a connector fitting portion (not shown), an electric wire 2 (a conductive path) is drawn out. Specifically, in a state in which the electric wire 2 is sealed by an overmold part 5, the electric wire 2 is drawn out from an electric-wire drawing part 4 of a connector housing 3 (a housing) made of a synthetic resin. The electric connector 1 is configured to have the sealing function of the overmold part 5 to prevent, for example, moisture (or an oily substance) from penetrating the connector housing 3 along the electric wire 2 from the outside. First, the above-mentioned individual components will be described.

A plurality of electric wires 2 are provided. However, the number of electric wires 2 is not particularly limited thereto. Here, one of them is shown in the drawing. An end of the electric wire 2 is connected to a terminal which is accommodated inside the connector housing 3 (not shown).

Figure 2:
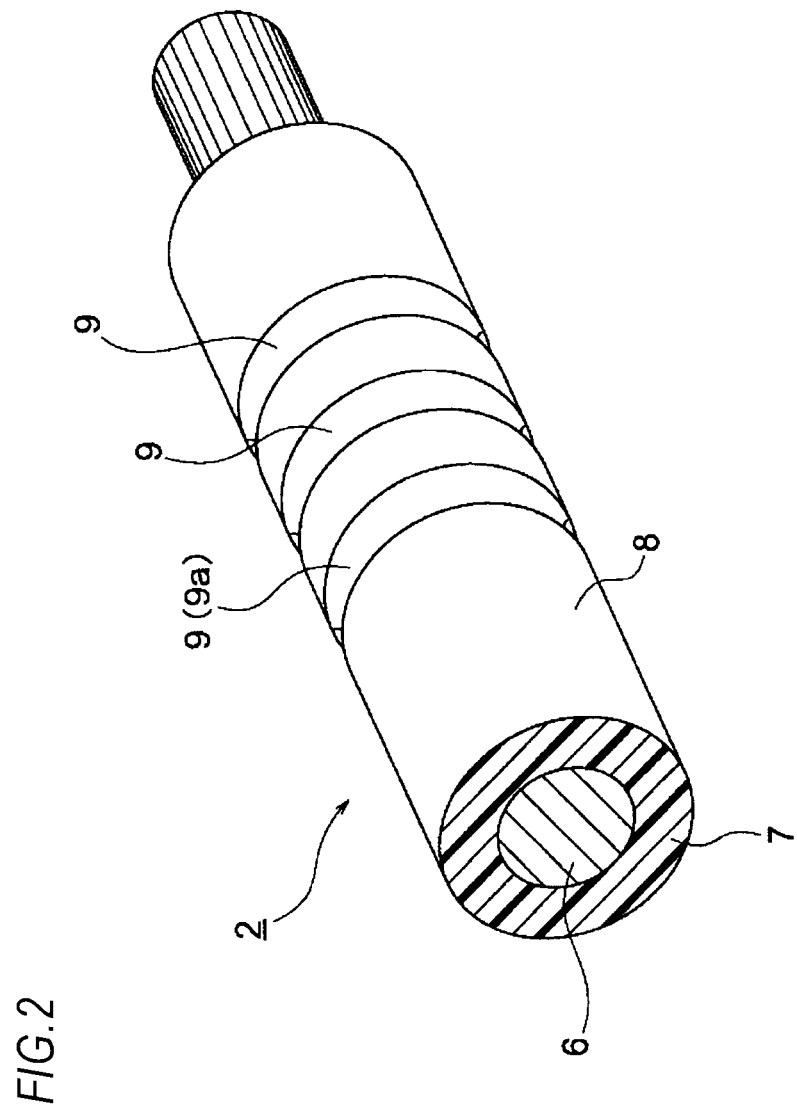
FIG. 2 is a perspective view illustrating an electric wire as the conductive path shown in FIG. 1.
Figure 3:
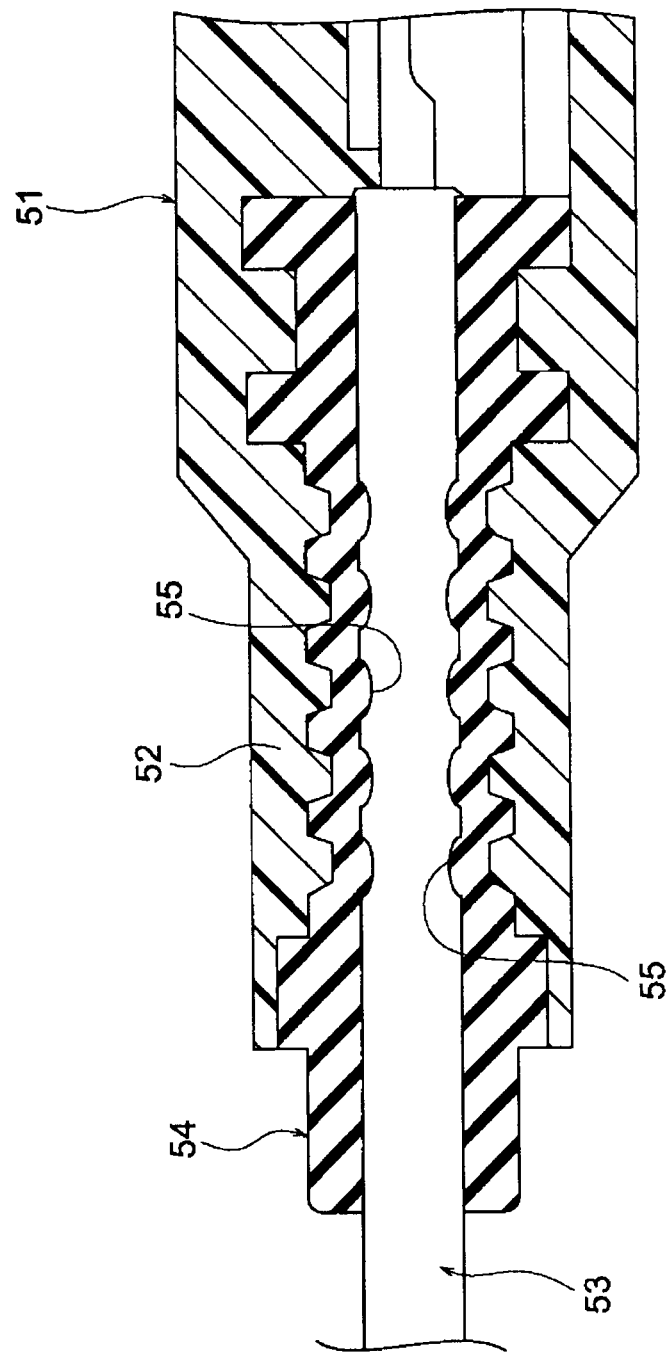
FIG. 3 is a cross-sectional view illustrating a waterproof structure for a conductive path which is a conventional example.

In FIGS. 1 and 2, the electric wire 2 is a conductive path including a conductor 6 and an insulator 7 (a cover), and is formed to have a length necessary for electrical connection. The electric wire 2 may be any one of a known high-voltage electric wire and a known low-voltage electric wire, or may have a form in which multiple electric wires are arranged in a lateral line if it is possible to form grooves 9 to be described below on the insulator 7. Also, the electric wire 2 may be any one of a known unsealed electric wire and a known sealed electric wire. Besides, the conductive path may be configured by providing an insulator (a cover) on a known bus bar. The above-mentioned conductive path such as the electric wire 2 has flexibility.

The conductor 6 is made of copper, a copper alloy, or aluminum. The conductor 6 may be any one of a conductor having a conductor structure formed by interweaving element wires and a conductor having a rod-like conductor structure having a rectangular section shape or a round section shape (which is, for example, a conductor structure to be a rectangular single core or a round single core, and in this case, the electric wire also have a rod shape).

The insulator 7 is an insulator made by extruding a known covering material on the conductor 6, and is formed to be capable of securing a predetermined thickness necessary for insulation. A plurality of grooves 9 are formed on an outer circumferential surface 8 of this insulator 7. The grooves 9 are ring-like grooves extending to make a circle around the outer circumferential surface 8, and are formed to be so deep that the bottom portions of the grooves do not reach the conductor 6. The grooves 9 are formed such that the continuous length of the side and bottom portions of each groove is sufficiently longer than the straight length of the opening of the corresponding groove.

In the present embodiment, the grooves 9 are formed to have a semi-circular section shape. However, the present invention is not limited thereto. In other words, the grooves 9 may be formed to have a rectangular section shape or a V-like section shape. The grooves 9 are formed to be hollow by heat or cutting. The grooves 9 are not formed to be hollow by pressing, unlike the conventional example. In other words, the grooves 9 are formed without imposing an unnecessary load on the conductor 6.

The grooves 9 are formed within a predetermined range L on the outer circumferential surface 8 of the insulator 7. This predetermined range L is set as a range in which the overmold part 5 is provided. Within the predetermined range L, three grooves 9 are formed at desired intervals (it is an example that the number of grooves 9 is three, and the number of grooves 9 is not limited as long as it is possible to sufficiently obtain a necessary creepage distance). Among the three grooves 9, a groove 9a closest to an end portion 10 of the overmold part 5 is formed at a position such that even if the electric wire 2 is bent such that a slight gap is formed between the outer circumferential surface 8 and an inner circumferential surface 11 of the overmold part 5, the gap does not reach the groove 9a. In the present embodiment, since the three grooves 9 are formed at the desired intervals, the creepage becomes a mazy state.

The overmold part 5 is a seal member made of an elastomer by a known forming method, and is disposed and formed within the predetermined range L of the electric wire 2. Also, the overmold part 5 is formed to fill all of the three grooves 9 (reference numerals 12 represent groove filling portions which fill the grooves 9). The overmold part 5 is formed to be in close contact (a watertight state) with respect to the outer circumferential surface 8 (including the grooves 9) of the insulator 7 and the electric-wire drawing part 4 of the connector housing 3. The overmold part 5 has an insulation property, and functions in place of the insulator 7 with respect to the hollow portions of the grooves 9.

With respect to the overmold part 5, as the elastomer, rubber or a thermoplastic elastomer can be exemplified.

In the above-mentioned configuration and structure, when the front end of the electric wire 2 is inserted from the electric-wire drawing part 4 of the connector housing 3, the connector housing 3 and the electric wire 2 are disposed at predetermined positions, and then the elastomer is poured between the connector housing 3 and the electric wire 2, thereby forming the overmold part 5, the waterproof structure according to the present embodiment as shown in FIG. 1 is completed. Alternatively, when the overmold part 5 is provided on the electric wire 2 in advance, and then the connector housing 3 is provided to be in close contact with the overmold part 5, the waterproof structure according to the present embodiment as shown in FIG. 1 is completed.

According to the waterproof structure related to the present embodiment, since the plurality of grooves 9 are provided on the outer circumferential surface 8 of the insulator 7, an effect that it is possible to surely obtain the creepage distance on the basis of the plurality of grooves 9 is accomplished. Also, according to the waterproof structure related to the present embodiment, since the overmold part 5 is provided to fill the plurality of grooves 9, the waterproof structure has an effect that it is possible to prevent an unnecessary load from being imposed on the conductor 6.

Although the waterproof structure for a conductive path according to the present invention has been described in detail with reference to the specific embodiment, it is apparent that the present invention is not limited to the above-mentioned each embodiment, but can be variously changed within the gist of the present invention.

This application is based on Japanese Patent Application (Application No. 2010-178307) filed on Aug. 9, 2010 whose contents are incorporated herein by reference.

INDUSTRIAL APPLICABILITY

According to the waterproof structure for the conductive path related to the present invention, an effect that it is possible to waterproof the conductive path without imposing an unnecessary load on the conductor is accomplished. Also, an effect that it is possible to sufficiently obtain a creepage distance is accomplished.

DESCRIPTION OF REFERENCE NUMERALS AND SYMBOLS

1 Electric Connector
2 Electric Wire (Conductive Path)
3 Connector Housing (Housing)
4 Electric-Wire Drawing Part
5 Overmold Part
6 Conductor
7 Insulator
8 Outer Circumferential Surface 9 Groove
10 End Portion
11 Inner Circumferential Surface
12 Groove Filling Portion

The invention claimed is:
1. A waterproof structure for a conductive path, comprising:
   a connector housing;
   an electric wire including a conductor and an insulator that covers the conductor, the electric wire being inserted from an electric-wire drawing part of the connector housing; and
   an overmold part formed by pouring an elastomer between the connector housing and the electric wire and provided to be watertight with respect to the electric-wire drawing part of the connector housing, wherein
   a groove is formed to be hollow by heat or cutting and provided to extend in a circumferential direction within a predetermined range on an outer circumferential surface of the insulator covering the conductor, and the overmold part is formed over the entire predetermined range such that the overmold part fills the groove,
   the groove has a semi-circular section shape, and
   the conductor is free from contacting the overmold part.
2. The waterproof structure for the conductive path according to claim 1, wherein the overmold part is not compressed against the outer circumferential surface of the insulator.
3. The waterproof structure for the conductive path according to claim 1, wherein an inner circumferential of the insulator is smooth along the entire predetermined range.

* * * * *